United States Patent
Bartlett

(10) Patent No.: US 9,643,468 B2
(45) Date of Patent: May 9, 2017

(54) REGENERATIVE VEHICLE AIR CONDITIONING SYSTEM

(71) Applicant: Matthew Bartlett, Northville, MI (US)

(72) Inventor: Matthew Bartlett, Northville, MI (US)

(73) Assignee: FCA US LLC, Auburn Hills, MI (US)

(*) Notice: Subject to any disclaimer, the term of this patent is extended or adjusted under 35 U.S.C. 154(b) by 296 days.

(21) Appl. No.: 14/458,696

(22) Filed: Aug. 13, 2014

(65) Prior Publication Data
US 2016/0047562 A1 Feb. 18, 2016

(51) Int. Cl.
| | |
|---|---|
| *F25B 1/00* | (2006.01) |
| *B60H 1/00* | (2006.01) |
| *F28D 1/053* | (2006.01) |
| *F28D 20/02* | (2006.01) |
| *F28F 1/00* | (2006.01) |
| *F28F 1/02* | (2006.01) |
| *F28D 21/00* | (2006.01) |

(52) U.S. Cl.
CPC .............. *B60H 1/00* (2013.01); *B60H 1/005* (2013.01); *F28D 1/05383* (2013.01); *F28D 20/02* (2013.01); *F28F 1/003* (2013.01); *F28F 1/022* (2013.01); *F28D 2021/0085* (2013.01)

(58) Field of Classification Search
CPC . B60H 1/005; B60H 1/00492; B60H 1/00485
See application file for complete search history.

(56) References Cited

U.S. PATENT DOCUMENTS

| | | | |
|---|---|---|---|
| 6,691,527 B2 | 2/2004 | Bureau et al. | |
| 6,854,286 B2 | 2/2005 | Bureau et al. | |
| 7,251,946 B2 | 8/2007 | Bureau et al. | |
| 8,464,550 B2 | 6/2013 | Kerler et al. | |
| 8,978,412 B2 * | 3/2015 | Ahn ........................ | B60H 1/323 62/117 |
| 2002/0088246 A1 * | 7/2002 | Bureau .............. | B60H 1/00321 62/434 |
| 2005/0086953 A1 * | 4/2005 | Sugesawa .............. | B60H 1/005 62/133 |
| 2012/0042687 A1 | 2/2012 | Kamoshida et al. | |
| 2013/0047663 A1 | 2/2013 | Kamoshida et al. | |
| 2013/0283827 A1 * | 10/2013 | Wang .................... | F25B 49/022 62/61 |
| 2014/0165647 A1 | 6/2014 | Hirayama et al. | |

(Continued)

*Primary Examiner* — Elizabeth Martin
(74) *Attorney, Agent, or Firm* — Ralph E. Smith

(57) ABSTRACT

A regenerative air conditioning system for a vehicle includes a condenser, a compressor, an evaporator subsystem, an expansion valve, and a solenoid controlled expansion valve arranged and coupled together in a direct expansion cooling circuit. The evaporator subsystem has a main evaporator and a storage evaporator. The storage evaporator has a phase change material therein surrounding refrigerant passages in the storage evaporator. The storage evaporator in a charge state when the vehicle is decelerating wherein refrigerant flows through the storage evaporator to cool the phase change material to cause it to change phases to store thermal cooling potential. The storage evaporator in a discharge state when the vehicle is stopped and an engine of the vehicle is off to cool cabin cooling air flowing across the storage evaporator by the phase change material absorbing heat from the cabin cooling air flowing across the storage evaporator.

8 Claims, 5 Drawing Sheets

(56) References Cited

U.S. PATENT DOCUMENTS

2014/0174121 A1  6/2014 Hirayama et al.
2014/0182330 A1  7/2014 Kamoshida et al.
2014/0318164 A1* 10/2014 Hayakawa ............ F25B 41/043
                                                   62/222

* cited by examiner

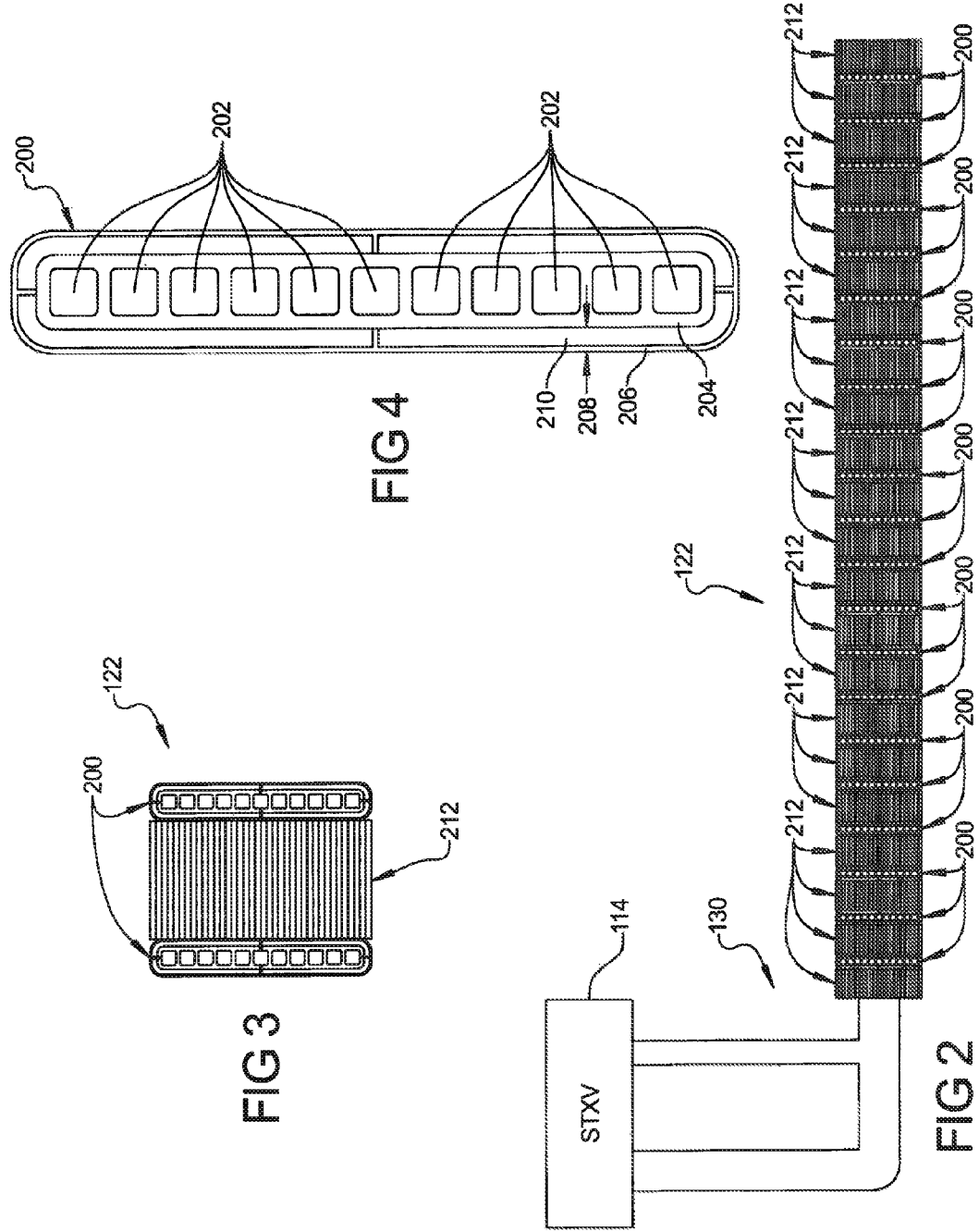

| Vehicle Op. Modes | Engine Run State | Cabin Thermal State | Compressor State | Main Evaporator Mode | Storage Evaporator Mode | Discharge Cabin Air Temperature Control Function |
|---|---|---|---|---|---|---|
| Acceleration and steady state driving | Normal run | Hot, high solar load | High displacement limited by high head pressure control | Normal operation | Supplemental Cooling State (under super heat authority of STXV) | Max cool, recirc air |
| Acceleration and steady state driving | Normal run | Mid cool-down range | Displacement setting controlled by suction pressure control for freeze protection | Normal operation under suction pressure based freeze protection control | Discharge State (SXTV closed) (If 'charged' by a deceleration event, the storage evaporator will pre-cool the cabin air until the stored potential is dissipated) | Max cool, partial outside air used Zone control by trimming blend air function |
| Acceleration and steady state driving | Normal run | Steady state AC load - fully cooled down to comfort range | Gliding suction pressure control for cabin air temperature moderation | Normal operation under suction pressure based temperature control | Discharge State (SXTV closed) (If 'charged' by a deceleration event, the Storage Evaporator will pre-cool the Cabin Air until the stored potential is dissipated) | Gliding evaporator temperature control by suction pressure modulation Zone control by trimming blend air function |

FIG 5A

| Vehicle Op. Modes | Engine Run State | Cabin Thermal State | Compressor State | Main Evaporator Mode | Storage Evaporator Mode | Discharge Cabin Air Temperature Control Function |
|---|---|---|---|---|---|---|
| Deceleration intervals | Fuel shut-off, transmission downshifted to increase FEAD RPM | Hot, high solar load | Max displacement | Normal operation | Charge State (under super heat authority of STXV) | Max cool, recirc Air |
| Deceleration intervals | Fuel shut-off, transmission downshifted to increase FEAD RPM | Mid Cool-down range | Max displacement | Normal operation | Charge State (under super heat authority of STXV) | Max cool, partial outside air used<br><br>Zone control by trimming blend air function |
| Deceleration intervals | Fuel shut-off, transmission downshifted to increase FEAD RPM | Steady state AC load - fully cooled down to comfort range | Max displacement | Normal operation | Charge State (under super heat authority of STXV) | Blend air temperature control to avoid cabin air temperature swings when compressor goes to high displacement and storage evaporator is operating<br><br>Zone control by trimming blend air function |

FIG 5B

| Vehicle Op. Modes | Engine Run State | Cabin Thermal State | Compressor State | Main Evaporator Mode | Storage Evaporator Mode | Discharge Cabin Air Temperature Control Function |
|---|---|---|---|---|---|---|
| Stop | Engine off | Hot, high solar load | Engine Run / AC compressor operates because of high cabin temperatures | Normal operation | Discharge State (SXTV closed) (phase change material absorbing thermal energy from air-stream) | Max cool, recirc air |
| Stop | Engine off | Mid cool-down range | Off until cabin discharge air temperature rises too much then re-start and operate in normal displacement range | Off until engine restarts then normal operation | Discharge State (SXTV closed) (phase change material absorbing thermal energy from air-stream) | Max cool, recirc air |
| Stop | Engine off | Steady state AC load - fully cooled down to comfort range | Off until cabin discharge air temperature rises too much then re-start and operate in normal displacement range | Off until engine restarts then normal operation | Discharge State (SXTV closed) (phase change material absorbing thermal energy from air-stream) | Max cool, recirc air |

FIG 5C

REGENERATIVE VEHICLE AIR CONDITIONING SYSTEM

FIELD

The present invention relates to air conditioning systems for automotive vehicles.

BACKGROUND

A typical air conditioning system for an automotive vehicle includes a compressor, an evaporator, a condenser (typically part of the vehicle's cooling module) and an expansion valve arranged in a direct expansion cooling circuit. Some of these systems include a phase change material built into the main evaporator which is used to provide cooling for a short period of time without running the compressor. Certain vehicles having start-stop functionality include such evaporators having built-in phase change material that surrounds refrigerant passages in the evaporators. It should be understood that this phase change material is not the refrigerant which is circulated through the air conditioning system by the compressor which is also a phase change material, typically changing phases between liquid and gas and back to liquid as it circulated around the direct expansion cooling circuit of the air conditioning system. In vehicles having start-stop functionality, an engine of the vehicle is off when the vehicle is at a stop. The phase change material in the main evaporator was cooled to change phase when the vehicle engine was running and the compressor thus running. For example, the phase change material is frozen from a liquid to a solid state. When the vehicle is at a stop and the engine not running, the phase change material absorbs heat from the evaporator and keeps the evaporator cool. Air flowing across the evaporator is thus continued to be cooled while the vehicle engine and thus the compressor of the air conditioning system is off. This provides fuel savings as there is no need to run the vehicle engine when the vehicle is at a stop to continue to maintain cool air flowing into the passenger cabin of the vehicle to cool it. Otherwise, if the vehicle is at a stop, and cooling is needed for the passenger cabin, the vehicle engine needs to be restarted to run the compressor of the air conditioning system to cool the passenger cabin. Such evaporators having built in phase change material typically provide a few minutes of cooling when the vehicle engine and thus the compressor is off. This is typically adequate to keep cool air flowing into the passenger cabin (if needed) for the periods of time that a vehicle is at a stop during normal driving, such as the time that a vehicle is stopped at a red light or a stop sign.

In vehicle air conditioning systems in which the phase change material is built into the main evaporator, the cooling effect is delayed when the air conditioning system is first turned. This is due to the need to cool the phase change material sufficient for it to change state to the lower enthalpy phase state, such as freezing to a solid. The same is the case after a stop-start event if the phase change material has absorbed sufficient heat so that all the phase change material has changed to the higher enthalpy phase state, such as melting to a liquid. Such systems also do not include a place to store energy during a deceleration or braking event. When a vehicle is decelerating, there is typically mechanical energy that in effect is in effect going to waste.

SUMMARY

A regenerative air conditioning system for a vehicle includes a condenser, a compressor, an evaporator subsystem, an expansion valve, and a solenoid controlled expansion valve arranged and coupled together in a direct expansion cooling circuit. The evaporator subsystem has a main evaporator coupled to the expansion valve and a storage evaporator coupled to the solenoid controlled expansion valve. The evaporator subsystem has separate parallel refrigerant flow paths with one refrigerant flow path through the main evaporator and expansion valve coupled to the main evaporator and the other refrigerant flow path through the storage evaporator and the solenoid controlled expansion valve coupled to the storage evaporator. The main evaporator and storage evaporator are arranged so that cabin cooling air to be cooled passes across them serially for cooling before the cabin cooling air is provided to a passenger cabin of the vehicle to cool the passenger cabin. The storage evaporator has a phase change material therein surrounding refrigerant passages in the storage evaporator and the main evaporator does not have a phase change material therein surrounding refrigerant passages in the main evaporator. The storage evaporator is in a charge state when the vehicle is decelerating by the solenoid controlled expansion valve being open so that refrigerant flows through the storage evaporator to cool the phase change material to cause it to change to a lower enthalpy phase state to store thermal cooling potential. The storage evaporator is in a discharge state when the vehicle is stopped and an engine of the vehicle is off to cool cabin cooling air flowing across the storage evaporator by the phase change material absorbing heat from the cabin cooling air flowing across the storage evaporator. The solenoid controlled expansion valve is closed when the storage evaporator is in the discharge state.

In an aspect, the phase change material freezes from a liquid to a solid when it changes to the lower enthalpy phase state when the storage evaporator is in the charge state to store the thermal cooling potential and melts when the storage evaporator is in the discharge state as the phase change material absorbs heat from the cabin cooling air flowing across the storage evaporator.

In an aspect, during acceleration and steady state driving of the vehicle, the solenoid controlled expansion valve is closed and the storage evaporator is not in the charge state.

In an aspect, during acceleration and steady state driving of the vehicle, the solenoid controlled expansion valve is closed and the storage evaporator is not in the charge state unless supplemental cooling is needed to cool the passenger cabin in which case the solenoid controlled expansion valve is open allowing refrigerant to flow through the storage evaporator and supplemental cooling is provided by the storage evaporator.

BRIEF DESCRIPTION OF THE DRAWINGS

The present invention will become more fully understood from the detailed description and the accompanying drawings, wherein:

FIG. 2 is a diagrammatic view of a storage evaporator of the regenerative air conditioning system of FIG. 1 and an associated solenoid controlled expansion valve;

FIG. 3 is a diagrammatic view of a portion of the storage evaporator of FIG. 2 showing adjacent tube having refrigerant passages therein with fins extending between the adjacent tubes;

FIG. 4 is a diagrammatic view of a tube of the storage evaporator of FIG. 2 having refrigerant passages therein; and FIGS. 5A-5C are a state table showing control states for the control of the regenerative air conditioning system of FIG. 1.

DETAILED DESCRIPTION

Figure 1:
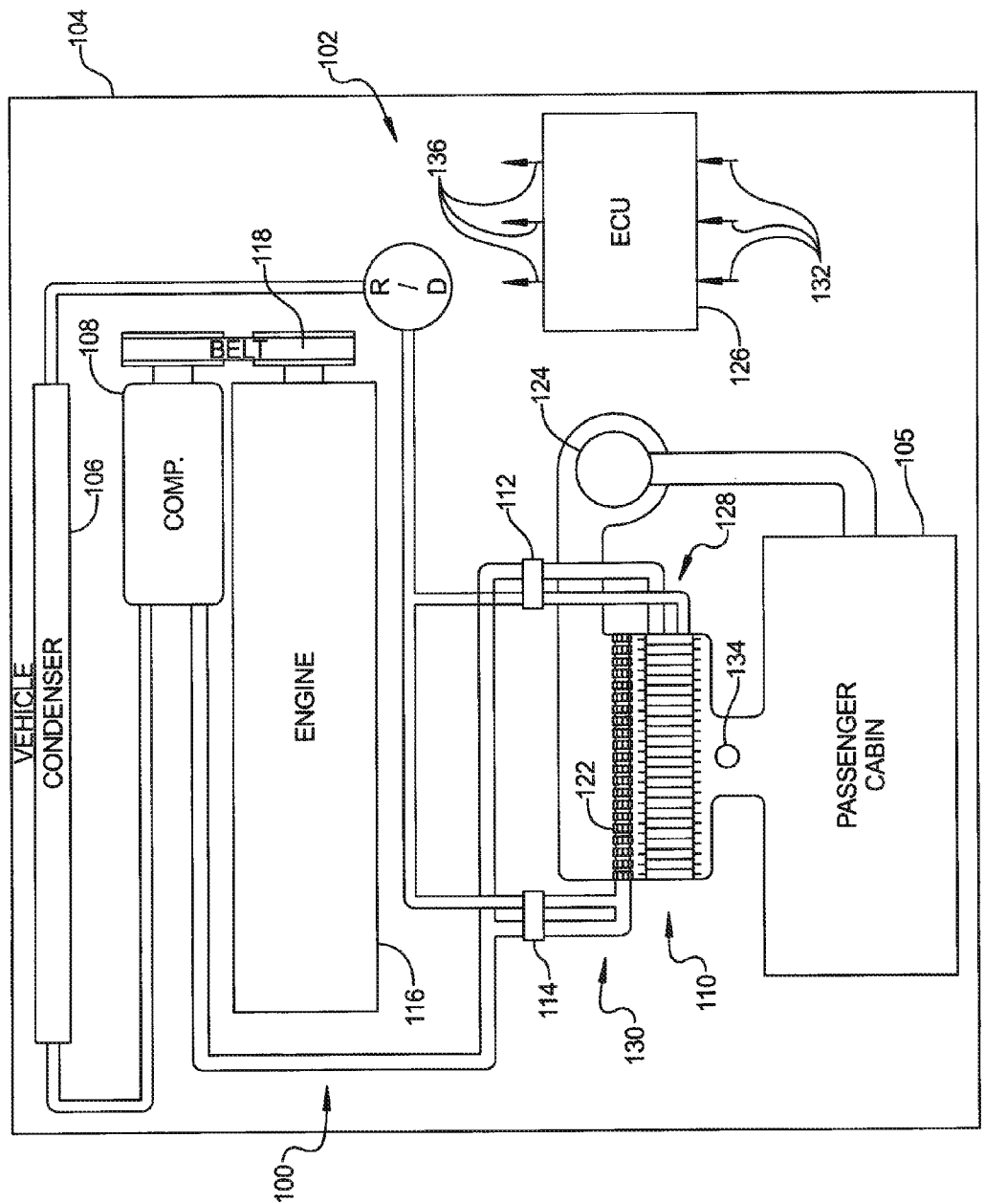
FIG. 1 is a basic schematic diagram of a regenerative air conditioning system in accordance with an aspect of the present disclosure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

In accordance with an aspect of the present disclosure, a regenerative vehicle air conditioning system includes a storage evaporator in addition to a main evaporator. The storage evaporator has a phase change material built into it which is used to store thermal cooling potential by converting mechanical energy generated during deceleration of the vehicle into thermal cooling potential. This storage evaporator then converts the stored thermal cooling potential into temperature and humidity reductions in the cabin cooling air stream entering the passenger cabin. This advantageously occurs when the engine of a vehicle having start-stop is off.

FIG. 1 is a basic schematic diagram of a regenerative air conditioning system 100 of a vehicle heating-ventilation-air conditioning ("HVAC") system 102 in a vehicle 104 (shown representatively as block 104) in accordance with an aspect of the present disclosure. Vehicle 104 includes passenger cabin 105 (shown representatively by block 105 within block 104) which is heated or cooled by HVAC system 102. When passenger cabin 105 is being cooled, regenerative air conditioning system 100 is typically used to do so although in some cases, outside ambient air is used to cool or aid in cooling passenger cabin 105 (typically depending on the temperature of the outside ambient air).

Regenerative air conditioning system 100 includes a condenser 106, a compressor 108, evaporator subsystem 110, expansion valve 112 and solenoid controlled expansion valve 114. It should be understood that expansion valve 112 can also be a solenoid controlled expansion valve. It should also be understood that the term solenoid controlled expansion valve is broadly to include any expansion valve that is controllable by a control signal to be open or closed (with a solenoid being a common type of device to control the valve). Compressor 108 is powered by engine 116 of vehicle 104, and for example is coupled to engine 116 by a belt 118. Compressor 108 is illustratively an electronically controlled variable displacement compressor. In an example, solenoid controlled expansion valve is a device that incorporates both a solenoid valve and an expansion valve. In another example, the solenoid valve and the expansion valve are separate devices and coupled in series with each other to provide solenoid controlled expansion valve 114.

Evaporator subsystem 110 includes main evaporator 120 and storage evaporator 122 having parallel refrigerant flow paths through which a refrigerant flows. HVAC system 102 includes a blower 124 for blowing air, referred to herein as "cabin cooling air," across main evaporator 120 and storage evaporator 122 to cool the cabin cooling air before it is introduced into a passenger cabin 105 of vehicle 104. HVAC system 102 also includes an electronic control unit ("ECU") 126 for controlling the various components of HVAC system 102, including regenerative air conditioning system 100, as will be discussed in more detail below.

Condenser 106, compressor 108, expansion valve 112, solenoid controlled expansion valve 114 and evaporator subsystem 110 are arranged and coupled together in a direct expansion cooling circuit with separate parallel refrigerant flow paths 128, 130 through expansion valve 112 and main evaporator 120 and through solenoid controlled expansion valve 114 and storage evaporator 122. Refrigerant flow path 128 is through expansion valve 112 and main evaporator 120 and refrigerant flow path 130 is through solenoid controlled expansion valve 114 and storage evaporator 122. In an embodiment, storage evaporator 122 is incorporated in main evaporator 120. In another embodiment, storage evaporator is a separate evaporator from main evaporator 120. In either case, the refrigerant flow path 130 through storage evaporator 122 is separate from refrigerant flow path 128 through main evaporator 120.

Main evaporator 120 and storage evaporator 122 are arranged so that cabin cooling air flows across them serially. In the embodiment shown in FIG. 1, storage evaporator 122 is upstream of the main evaporator so that the cabin cooling air first flows across storage evaporator 122 and then across main evaporator 120 before being provided to passenger cabin 105. When it is stated that cabin cooling air flows across an evaporator, it means it flows across the tubes containing the refrigerant passages. In the embodiment shown in FIG. 1, the cabin cooling air flows through the evaporators, flowing across the fins and tubes of the evaporators.

FIGS. 2-4 show storage evaporator 122 in more detail. Storage evaporator 122 includes a plurality of tubes 200 with each tube 200 having a plurality of refrigerant passages 202 therein. Each tube 200 has an inner portion 204 having the refrigerant passages 202 therein and an outer portion 206 with a space 208 between the inner portion 204 and the outer portion 206. A phase change material 210 is disposed in space 208. An example of phase change material 210 is Tetradecane. It should be understood that other phase change materials are suitable for use as phase change material 210, such as hydro-carbons or different molecular weights and chain length or mixtures of such materials. The phase change material used for phase change material 210 is illustratively selected from phase change materials that change phase between higher and lower enthalpy phase states, such as from liquid to solid and vice-versa, at a temperature low enough so that the phase change material 210 in solid form will have sufficient stored thermal cooling potential to provide cooling during short stops of vehicle 104 when engine 116 is off to keep passenger cabin 105 cool while vehicle 104 is stopped without the need to restart engine 116 of vehicle 104. Fins 212 extend between adjacent tubes 200. It should be understood that phase change material 210 is not the refrigerant that is circulated in regenerative air conditioning system 100 by compressor 108 which typically changes phases from liquid to gas and back to liquid as it is circulated around in the direct expansion cooling circuit of regenerative air conditioning system 100 by compressor 108. In the example shown in the drawings, storage evaporator 122 is a micro-channel evaporator with refrigerant passages 202 being micro channels. It should be understood that in another example storage evaporator 122 is a fin-and-tube evaporator. In an example, main evaporator 120 is a micro-channel evaporator. In another example, main evaporator 120 is a fin-and-tube evaporator.

With reference to the state table of FIGS. 5A-5C, the operational control of regenerative air conditioning system 100 is now described in more detail in the context of basic operating modes of vehicle 104 which include acceleration and steady state driving in which engine 116 of vehicle 104 is running normally, deceleration and stop, and the basic states of the passenger cabin 105 of vehicle 104 which include hot, high thermal load, mid cool-down range, and steady state AC load (fully cooled down to comfort range). When vehicle 104 is in the acceleration and steady state drive mode and the passenger cabin 105 is in the hot, high thermal load state, ECU 126 controls compressor 108 to be in high displacement limited by high head pressure control. Main evaporator 120 is in normal operation in which refrigerant is flowing through expansion valve 112 and main evaporator 120 and storage evaporator 122 is also in operation (in a supplemental cooling state) to provide supplemental cooling in which refrigerant is also flowing through solenoid controlled expansion valve 114 (referenced as "SXTV" in FIGS. 5A-5C) and storage evaporator 122. ECU 126 controls solenoid controlled expansion valve 114 to be open to cause storage evaporator 122 to be in operation in its supplemental cooling state. Having refrigerant flowing through both main evaporator 120 and storage evaporator 122 provides maximum cooling of the HVAC air flowing across evaporators 120, 122 and then into the passenger cabin.

When vehicle 104 is in the acceleration and steady state drive mode and the passenger cabin 105 is in the mid cool-down range state, ECU 126 controls the displacement of compressor 108 based on suction pressure control for freeze protection of main evaporator 120. Main evaporator 120 is in normal operation under the foregoing suction pressure based freeze protection control. Storage evaporator 122 is in a discharge state. When storage evaporator 122 is in a discharge state, solenoid controlled expansion valve 114 is closed and refrigerant is not flowing through storage evaporator 122. Heat from the cabin cooling air flowing across storage evaporator 122 will be absorbed by phase change material 210 until the temperature of phase change material 210 reaches equilibrium with the temperature of the cabin cooling air flowing across storage evaporator 122. ECU 126 controls solenoid controlled expansion valve 114 to be closed to put storage evaporator 122 in the discharge state. Illustratively, storage evaporator 122 is in a fully discharged state when phase change material 210 is liquid and its temperature is in equilibrium with the temperature of the cooling cabin air flowing across storage evaporator 122. In the event that storage evaporator 122 is not in a fully discharged state, it will pre-cool the cabin cooling air passing across it before the cabin cooling air passes through the main evaporator until phase change material 210 absorbs sufficient heat to have fully melted and its temperature reached equilibrium with the temperature of the cabin cooling air flowing across storage evaporator 122, dissipating the stored thermal cooling potential. This improves a cool-down rate of the cabin cooling air which allows for a reduction of displacement settings for compressor 108 earlier in a drive cycle, which reduces the load drawn by compressor 108.

When vehicle 104 is in the vehicle acceleration and steady state drive mode and the passenger cabin 105 is in the steady state AC load state, ECU 126 controls compressor 108 using gliding suction pressure control for moderation of the temperature of the cabin cooling air entering passenger cabin 105. Main evaporator 120 is in normal operation under the foregoing suction pressure based temperature control. Storage evaporator 122 is in the discharge state and ECU 126 controls solenoid expansion valve 114 to be closed to keep storage evaporator 122 in the discharge state. In the event that storage evaporator 122 is not in a fully discharged state, it will pre-cool the cabin cooling air passing through it before the cabin cooling air passes through the main evaporator until phase change material 210 absorbs sufficient heat to have fully melted and its temperature reached equilibrium with the temperature of the cabin cooling air flowing across storage evaporator 122, dissipating the stored thermal cooling potential. This also allows for a reduction of displacement settings for compressor 108, which reduces the load drawn by compressor 108.

When vehicle 104 is in the deceleration mode (i.e. vehicle 104 is decelerating, compressor 108, main evaporator 120 and storage evaporator 122 operate the same regardless of the state of the passenger cabin. 105. ECU 126 controls compressor 108 to have maximum displacement so that compressor 108 is in a full on state. Main evaporator 120 is in normal operation (full on) and storage evaporator 122 is in a "charge" state. In the context of the present application, storage evaporator is in the charge state when solenoid controlled expansion valve 114 is open allowing refrigerant to flow through storage evaporator 122 which results in thermal cooling potential being stored in phase change material 210. More specifically, phase change material 210 is cooled by the refrigerant flowing through storage evaporator 122 and eventually changes phases to a lower enthalpy phase state, such as by freezing from a liquid to a solid.

When vehicle 104 is in the stop mode, engine 116 is off unless the passenger cabin 105 requires cooling that storage evaporator 122 is unable to provide, as discussed below. In which case, engine 116 is on to run compressor 108. When vehicle 104 is in the stop mode and passenger cabin 105 is in the hot, high solar load stage (which requires use of compressor 108 and main evaporator 120 to provide sufficient cooling to passenger cabin 105, engine 116 is on to run compressor 108. Main evaporator 120 is in normal operation. Storage evaporator 122 is in the discharge state. Since storage evaporator 122 has been charged during the deceleration mode of vehicle 104 prior to vehicle 104 coming to a stop, it will pre-cool the cabin cooling air passing across it before the cabin cooling air passes across the main evaporator 120 until phase change material 210 absorbs sufficient heat to have fully changed to the higher enthalpy phase state, such as having fully melted, and its temperature reached equilibrium with the temperature of the cabin cooling air flowing across storage evaporator 122, dissipating the stored thermal cooling potential.

When vehicle 104 is in the stop mode and the passenger cabin 105 is in either the mid cool-down range state or the steady state AC load—fully cooled down to comfort range state, engine 116 (and thus compressor 108) is off until the temperature of the cabin cooling air entering passenger cabin 105 rises to a predetermined temperature. Once the temperature of the cabin cooling air entering the passenger cabin has risen to the predetermined temperature, engine 116 is restarted to run compressor 108 to provide the requisite cooling. Main evaporator 120 is off since compressor 108 is off and refrigerant is not being circulated. Main evaporator 120 remains off until engine 116 is restarted to run compressor 108 and main evaporator 120 will then be in normal operation once compressor 108 is running. Storage evaporator 122 is in the discharge state. Since storage evaporator 122 has been charged during the deceleration mode of vehicle 104 prior to vehicle 104 coming to a stop, it will pre-cool the cabin cooling air passing across it before the cabin cooling air passes through the main evaporator 120 until phase change material 210 absorbs sufficient heat to have fully changed to the higher enthalpy phase state, such has having fully melted from a solid to a liquid, and its temperature reached equilibrium with the temperature of the cabin cooling air passing across storage evaporator 122, dissipating the stored thermal cooling potential. As long as main evaporator 120 is off, the cabin cooling air passing through main evaporator 120 and storage evaporator 122 is cooled by storage evaporator 122 and not main evaporator 120.

As mentioned, ECU 126 controls HVAC system 102 including regenerative air conditioning system 100. ECU 126 has inputs 132 coupled to sensors disposed in HVAC system 102, such as a temperature sensor 134 at a discharge side of main evaporator 120 or at an inlet of passenger cabin 105 to sense the temperature of the cabin cooling air entering passenger cabin 105. ECU 126 also has outputs 136 coupled to the components of HVAC system 102 that ECU 126 controls. ECU is also coupled to a communication bus in vehicle 104 (not shown), such as a CAN bus, to which other ECU's in the vehicle are coupled. In this regard, ECU 126 determines the modes in which vehicle 104 is in and the state that passenger cabin 105 is in based on readings of its inputs 132 and data it received over the vehicle communication bus. When it is stated herein that ECU 126 controls a component of HVAC system 102, it should be understood that ECU is configured to do so with appropriate logic to do so, which can be implemented in software, hardware, or a combination thereof. In an example, ECU 126 is a separate device. In another example, ECU 126 is an existing ECU of vehicle 104 in which the above described control is incorporated, such as a body controller ECU 126 vehicle 104.

ECU 126 in which the above described control methods are implemented is or includes a digital processor (DSP), microprocessor, microcontroller, or other programmable device which are programmed with software implementing the above described control methods. It should be understood that other logic devices are suitable for use as or as part of ECU 126, such as a Field Programmable Gate Array (FPGA), a complex programmable logic device (CPLD), or application specific integrated circuit (ASIC).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A regenerative air conditioning system for a vehicle, comprising:
    a condenser, a compressor, an evaporator subsystem, an expansion valve, and a solenoid controlled expansion valve arranged and coupled together in a cooling circuit;
    the evaporator subsystem having a main evaporator coupled to the expansion valve and a storage evaporator coupled to the solenoid controlled expansion valve, the evaporator subsystem having separate parallel refrigerant flow paths with one refrigerant flow path through the main evaporator and expansion valve coupled to the main evaporator and the other refrigerant flow path through the storage evaporator and solenoid controlled expansion valve coupled to the storage evaporator;
    the main evaporator and storage evaporator arranged so that cabin cooling air to be cooled passes across them for cooling before the cabin cooling air is provided to a passenger cabin of the vehicle to cool the passenger cabin;
    the storage evaporator having a phase change material therein at least partially surrounding refrigerant passages in the storage evaporator;
    the storage evaporator in a charge state when the vehicle is decelerating by the solenoid controlled expansion valve being open so that refrigerant flows through the storage evaporator to cool the phase change material to cause it to change to a lower enthalpy phase state to store thermal cooling potential;
    the storage evaporator in a discharge state when the vehicle is stopped and an engine of the vehicle is off to cool cabin cooling air flowing across the storage evaporator by the phase change material absorbing heat from the cabin cooling air, the solenoid controlled expansion valve closed when the storage evaporator is in the discharge state; and
    during acceleration and steady state driving of the vehicle, the solenoid controlled expansion valve is closed and the storage evaporator is not in the charge state.

2. The regenerative air conditioning system of claim 1 wherein the phase change material freezes from a liquid to a solid when it changes to the lower enthalpy phase state when the storage evaporator is in the charge state to store the thermal cooling potential and melts from the solid to the liquid when the storage evaporator is in the discharge state as the phase change material absorbs heat from the cabin cooling air flowing across the storage evaporator.

3. The regenerative air conditioning system of claim 1 wherein the compressor is a variable displacement compressor and during acceleration and steady state driving of the vehicle the cabin cooling air serially flows first through the storage evaporator and then through the main evaporator with the storage evaporator providing pre-cooling of the cabin cooling air until the thermal cooling potential is dissipated allowing a lower displacement setting of the variable displacement compressor while the storage evaporator is providing pre-cooling of the cabin cooling air.

4. The regenerative air conditioning system of claim 1 wherein during acceleration and steady state driving of the vehicle, the solenoid controlled expansion valve is closed and the storage evaporator is not in the charge state unless supplemental cooling is needed to cool the passenger cabin in which case the solenoid controlled expansion valve is open allowing refrigerant to flow through the storage evaporator and supplemental cooling is provided by the storage evaporator.

5. The regenerative air conditioning system of claim 1 including an electronic control unit configured to control the solenoid controlled expansion valve to be open when the storage evaporator is in the charge state and closed when the storage evaporator is in the discharge state.

6. A method of operating a regenerative air conditioning system for a vehicle, the regenerative air conditioning system including a condenser, a compressor, an evaporator subsystem, an expansion valve, and a solenoid controlled expansion valve arranged and coupled together in a cooling circuit and controlled by an electronic control unit, the evaporator subsystem having a main evaporator coupled to the expansion valve and a storage evaporator coupled to the solenoid controlled expansion valve, the evaporator subsystem having separate parallel refrigerant flow paths with one refrigerant flow path through the main evaporator and expansion valve coupled to the main evaporator and the other refrigerant flow path through the storage evaporator and solenoid controlled expansion valve coupled to the storage evaporator, the main evaporator and storage evaporator arranged so that cabin cooling air to be cooled passes across them for cooling before the cabin cooling air is provided to a passenger cabin of the vehicle to cool the passenger cabin, the storage evaporator having a phase change material therein at least partially surrounding refrigerant passages in the storage evaporator, the method comprising:

operating the storage evaporator in a charge state when the vehicle is decelerating by controlling with the electronic control unit the solenoid controlled expansion valve to be open so that refrigerant flows through the storage evaporator to cool the phase change material to cause it to change to a lower enthalpy phase state to store thermal cooling potential;

operating the storage evaporator and the storage evaporator in a discharge state when the vehicle is stopped and an engine of the vehicle is off to cool cabin cooling air flowing across the storage evaporator by the phase change material absorbing heat from the cabin cooling air and controlling with the electronic control unit the solenoid controlled expansion valve to be closed when the storage evaporator is in the discharge state; and during acceleration and steady state driving of the vehicle, controlling with the electronic control unit the solenoid controlled expansion valve to be closed so that the storage evaporator is not in the charge state.

7. The method of claim 6 wherein the compressor is a variable displacement compressor and during acceleration and during steady state driving of the vehicle the cabin cooling air serially flows first through the storage evaporator and then through the main evaporator with the storage evaporator providing pre-cooling of the cabin cooling air until the thermal cooling potential is dissipated, the method further including controlling with the electronic control the variable displacement compressor to have a lower displacement setting while the storage evaporator is providing pre-cooling of the cabin cooling air.

8. The method of claim 6 including during acceleration and steady state driving of the vehicle controlling with the electronic control unit the solenoid controlled expansion valve to be closed so that the storage evaporator is not in the charge state unless supplemental cooling is needed to cool the passenger cabin in which case controlling with the electronic control unit the solenoid controlled expansion valve to be open allowing refrigerant to flow through the storage evaporator so that the storage evaporator is in a supplemental cooling state and provides supplemental cooling of the cabin cooling air.

* * * * *